(12) United States Patent
Liu et al.

(10) Patent No.: US 12,627,548 B2
(45) Date of Patent: May 12, 2026

(54) RECEIVER FOR AND METHOD OF RECEIVING SYMBOLS OVER TIME VARYING CHANNELS WITH DOPPLER SPREAD

(71) Applicants: CONTINENTAL AUTOMOTIVE TECHNOLOGIES GMBH, Hannover (DE); NANYANG TECHNOLOGICAL UNIVERSITY, Singapore (SG)

(72) Inventors: Yujie Liu, Singapur (SG); David González González, Frankfurt am Main (DE); Yong Liang Guan, Singapore (SG)

(73) Assignees: Continental Automotive Technologies GmbH, Hannover (DE); Nanyang Technological University, Singapore (SG)

( * ) Notice: Subject to any disclaimer, the term of this patent is extended or adjusted under 35 U.S.C. 154(b) by 0 days.

(21) Appl. No.: 18/705,076

(22) PCT Filed: Oct. 26, 2022

(86) PCT No.: PCT/EP2022/079857
§ 371 (c)(1),
(2) Date: Apr. 26, 2024

(87) PCT Pub. No.: WO2023/072981
PCT Pub. Date: May 4, 2023

(65) Prior Publication Data
US 2025/0055738 A1 Feb. 13, 2025

(30) Foreign Application Priority Data

Oct. 27, 2021 (DE) .................... 10 2021 212 161.6
Mar. 18, 2022 (DE) .................... 10 2022 106 409.3

(51) Int. Cl.
*H04L 27/26* (2006.01)
*H04L 25/02* (2006.01)

(52) U.S. Cl.
CPC .... *H04L 27/26025* (2021.01); *H04L 25/0236* (2013.01)

(58) Field of Classification Search
CPC ........... H04L 27/26025; H04L 25/0236; H04L 25/0234; H04L 25/0232; H04L 25/023; H04L 25/0228; H04L 27/2603; H04L 27/2602
See application file for complete search history.

(56) References Cited

U.S. PATENT DOCUMENTS

| | | | |
|---|---|---|---|
| 2005/0147025 A1* | 7/2005 | Auer .................... | H04B 7/0684 |
| | | | 375/267 |
| 2017/0078054 A1* | 3/2017 | Hadani ................. | H04L 5/0023 |
| 2020/0389268 A1* | 12/2020 | Sathyanarayan ........................... | |
| | | | H04L 27/26532 |
| 2023/0370316 A1* | 11/2023 | Reddy ................. | H04L 27/2639 |

FOREIGN PATENT DOCUMENTS

DE 102021126321 A1 12/2022

OTHER PUBLICATIONS

International Search Report (PCT/ISA/210) and Written Opinion (PCT/ISA/237) mailed on Feb. 10, 2023, by the European Patent Office as the International Searching Authority for International Application No. PCT/EP2022/079857. (9 pages).

(Continued)

*Primary Examiner* — Khanh C Tran
(74) *Attorney, Agent, or Firm* — Buchanan Ingersoll & Rooney PC

(57) ABSTRACT

A near-optimal Karhunen-Loeve basis expansion modeling (KL-BEM) orthogonal time frequency space (OTFS) receiver with superimposed pilots has been proposed for high-mobility communications with Doppler spread channel. First, an initial KL-BEM channel estimation is conducted by superimposed pilots, followed by the removal of superimposed pilots from the received OTFS signal and equalisation by message passing (MP) algorithm. After that, the detected data symbols are utilized as pseudo pilots along (Continued)

with the superimposed pilots to refine both KL-BEM channel estimation and equalisation in an iterative manner. Simulation results confirm the superior performance of the proposed KL-BEM OTFS receiver over the prior art in terms of the mean-square-error (MSE) of channel estimation and bit error rate (BER). It also has a close BER performance to the BER lower bound obtained by assuming perfect channel estimation. It contributes to high spectral efficiency and fast convergence performance.

13 Claims, 5 Drawing Sheets

(56)                    References Cited

OTHER PUBLICATIONS

Yuan et al., "Data-Aided Channel Estimation for OTFS Systems With a Superimposed Pilot and Data Transmission Scheme", IEEE Wireless Communications Letters, Piscataway, NJ, USA, vol. 10, No. 9, Sep. 2021, pp. 1954-1958.
Liu et al., "Near-Optimal BEM OTFS Receiver With Low Pilot Overhead for High-Mobility Communications", IEEE Transactions on Communications, vol. 70, No. 5, May 2022, pp. 3392-3406.
Mishra et al., "OTFS Channel Estimation and Data Detection Designs With Superimposed Pilots", arXiv.org, 20201028 Cornell University Library, 201 Olin Library Cornell University Ithaca, NY 14853, Oct. 28, 2020. (31 pages).
Mishra et al., "Iterative Channel Estimation and Data Detection in OTFS Using Superimposed Pilots" Proc. IEEE Int. Conf. Commun. (ICC) Workshops, Montreal, QC, Canada, Jul. 2021, pp. 1-6.

* cited by examiner

RECEIVER FOR AND METHOD OF RECEIVING SYMBOLS OVER TIME VARYING CHANNELS WITH DOPPLER SPREAD

CROSS REFERENCE TO RELATED APPLICATIONS

This application is the U.S. National Phase Application of PCT International Application No. PCT/EP2022/079857, filed Oct. 26, 2022, which claims priority to German Application No. 10 2022 106 409.3, filed Mar. 18, 2022 and German Application No. 10 2021 212 161.6, filed Oct. 27, 2021, the contents of such applications being incorporated by reference herein.

FIELD OF THE INVENTION

The present invention relates to a method of receiving symbols over an orthogonal time frequency space (OTFS) communication channel subject to Doppler spread and a receiver implementing the method.

BACKGROUND

The sixth generation (6G) wireless communications and beyond are expected to serve a large number of high-mobility users, e.g., vehicles, subways, highways, trains, drones, low earth orbit (LEO) satellites, etc.

The preceding fourth and fifth generation (5G) wireless communications use orthogonal frequency division multiplexing (OFDM), which provides high spectral efficiency and high robustness against frequency selective fading channel, and also allow for using low-complexity equalisers. However, due to speed-dependent Doppler shifts or spreads and quickly varying multipath reception, high-mobility communications suffer from severe time and frequency dispersiveness. Time and frequency dispersiveness each cause signal fading at the receiver, and the fading is thus also referred to as doubly selective channel fading. Doubly selective channel fading significantly impairs the performance of OFDM communication.

As an alternative to OFDM, OTFS modulation was proposed as a solution for coping with doubly selective fading channels.

OTFS modulation is a 2D modulation scheme that multiplexes information QAM symbols over carrier waveforms that correspond to localized pulses in a signal representation that is referred to as delay-Doppler representation. The OTFS waveforms are spread over both time and frequency while remaining roughly orthogonal to each other under general delay-Doppler channel impairments. In theory, OTFS combines the reliability and robustness of spread spectrum with the high spectral efficiency and low complexity of narrowband transmission.

The OTFS waveforms couple with the wireless channel in a way that directly captures the underlying physics, yielding a high-resolution delay-Doppler Radar image of the constituent reflectors. As a result, the time-frequency selective channel is converted into an invariant, separable and orthogonal interaction, where all received symbols experience the same localized impairment and all the delay-Doppler diversity branches are coherently combined.

This renders OTFS ideally suited for wireless communication between transmitters and receivers that move at high speeds with respect to each other, e.g., receivers or transmitters located in high-speed trains, cars and even aircrafts.

However, OTFS presents its own challenges when it comes to channel estimation and equalisation in a receiver, and using adapted conventional OFDM receiver designs does not provide the required performance, requires significant pilot overhead of up to 50%, or provides acceptable performance only under ideal conditions, which are unrealistic in practice.

Throughout this specification, bold symbols represent vectors or matrices. Superscripts T, H and †, respectively denote the transpose, complex conjugate transpose and pseudo inverse of a vector or matrix. diag $\{a\}$ is a diagonal matrix with vector a on its diagonal, while diag $\{A\}$ is a vector whose elements are from the diagonal of matrix A. $\otimes$ is the Kronecker product.

SUMMARY OF THE INVENTION

An aspect of the present invention includes proposing a receiver for an OTFS transmission system and a corresponding method for receiving binary data sequences over an OTFS communication channel, in particular in OTFS communication channels having long delay spread and large Doppler spread, the receiver and method permitting using communication frames having a small pilot overhead or requiring no dedicated pilot slots at all while providing near-optimal performance from transmission to decoding.

The various aspects of the present invention rely on a novel model representing an OTFS channel, which will be introduced prior to discussing the application thereof in the novel receiver and the corresponding method for receiving.

FIG. 1 shows a block diagram of a general OTFS transmission system. A transmitter 200 comprises a first transmitter-side transformation unit 202 and a second transmitter-side transformation unit 204. Serial binary data is input to a signal mapper (not shown in the figure) that outputs a two-dimensional sequence of information symbols x[k, l] in which the QAM symbols are arranged along the delay period and the Doppler period of the delay-Doppler domain. The information symbols comprise data symbols, pilot symbols and guard symbols surrounding the pilot symbols. The two-dimensional sequence of information symbols x[k, l] is input to the first transmitter-side transformation unit 202 and is subjected to an inverse Finite Symplectic Fourier Transformation (ISFFT), which produces a matrix X[n, m] that represents the two-dimensional sequence of information symbols x[k, l] in the time-frequency domain. As the transmitter transmits in the time domain, a further transformation in the second transmitter-side transformation unit 204 is required, which produces the signal s[t] in the time domain, e.g., a Heisenberg transformation. The signal s[t] is then transmitted via an antenna 206 over the communication channel.

In a realistic environment the transmitted signal, on its way from the transmitter through the communication channel to the receiver, is subject to doubly selective fading with Doppler spread. The received signal is a superposition of a direct copy and a plurality of reflected copies of the transmitted signal, where each copy is delayed by a path delay that is dependent from the length of the signal's path delay and is frequency shifted by the Doppler shift that depends from the differential speed between transmitter, reflector, and receiver. Each of the signal copies is weighted in accordance with its particular path delay and differential speed. Typical Doppler shifts are on the order of 10 Hz-1 kHz, though larger values may occur in scenarios with extremely high mobility (e.g., high-speed trains) and/or high carrier frequency. As in realistic environments it is very likely that multiple reflectors and/or moving reflectors are present, the received superimposed signal is spread out over a frequency range rather than merely shifted in frequency, and the signal deformation is thus also referred to as Doppler spread. In the following description the realistic communication channel is also referred to as practical communication channel.

In FIG. 1 the practical communication channel is represented by the undisturbed radio waves emitted from the transmitter antenna 206 and the various unordered radio waves coming from different directions and with different distances to each other at the receiver antenna 302. The radio waves may arrive at the receiver's antenna directly or after being reflected one or several times at one or more stationary and/or moving objects, which may introduce Doppler shift and different delays to the reflected radio waves.

The receiver 300 picks up the received signal r[t] in the time domain, which is provided to a first receiver-side transformation unit 304, in which it is subjected to a Wigner transform for transforming the received signal r[t] into a matrix Y[n, m] representing the received signal r[t] in the time-frequency domain. For enabling signal detection in the delay-Doppler domain the matrix Y[n, m] is then provided to a second receiver-side transformation unit 306, where it is subjected to a Finite Symplectic Fourier Transformation (SFFT), which outputs a two-dimensional sequence of information symbols y[k, l] in the delay-Doppler domain. The two-dimensional sequence of information symbols y[k, l] is input to a channel estimation and equalisation block 310, which performs channel estimation CE and signal detection SD and reconstructs the symbols that were originally transmitted, and ultimately to a de-mapper that outputs the binary data that was originally transmitted (de-mapper not shown in the figure).

In order to enable channel estimation in the receiver, pilots may be added at the transmitter. These pilots, that are known beforehand at the receiver, are located at known positions within the two-dimensional sequence of information symbols that is ultimately transmitted. However, the pilots taking the place of data symbols, but not carrying any data, reduce the spectral efficiency of the system. In known OTFS receivers using CE-BEM channel estimation the pilot overhead, in order to achieve acceptable performance, must be increased with increasing maximum channel delay and Doppler spread, further reducing the spectral efficiency. While many OTFS channels may have a known maximum channel delay and possibly also maximum known Doppler spread, real-life systems will be designed for even higher maximum delay and Doppler spread, for providing some safety margin. This will even further reduce the spectral efficiency in such practical systems.

An improvement of the spectral efficiency can be achieved by using superimposed pilots and using the freed-up space for data symbols. Superimposed pilots employ low-powered pilots that are superimposed on data symbols in the delay-Doppler domain.

FIG. 2 shows an illustration of superimposed pilots. As is shown in the left part of FIG. 2, the pilots may be arranged across the entire plane of the two-dimensional sequence of information symbols that are arranged along the delay period and the Doppler period of the delay-Doppler domain, albeit at a much lower power. The pilots are represented by the ordered checkerboard pattern, indicating the fact that the pilots are known beforehand at the receiver. The data is represented by the random pattern, indicating the variable nature of the data that is transmitted. The power allocation is indicated by the distance from the delay-Doppler plane.

The right part of FIG. 2 shows an exemplary power allocation to pilots and data symbols. It is easy to see that the pilots have a much lower power than the data.

The data symbols and the pilots superimposed thereon are transformed into the OTFS signal vector, that is ultimately transmitted after further transformations.

In the following discussion of the transmitted signal M and N represent the dimensions of the delay grid and the Doppler grid, respectively, in which the symbols are arranged. The transmitted complex OTFS vector x, which consists of both superimposed pilots and data symbols, is defined as $$x = [x[0, 0], x[0, 1], \ldots, x[0, M-1], \ldots, x[N-1, 0],$$
$$x[N-1, 1], \ldots, x[N-1, M-1]]^T.$$

In realistic scenarios, there is a constraint for the transmission power which covers both data and pilot transmission, i.e., data symbols and pilots share the total transmission power available to the transmitter. The transmitted complex OTFS vector x can be represented as a superimposed pilot vector $x_{sp}$ and a data vector $x_d$, in the delay-Doppler domain, which are defined as $$x_{sp} = [x_{sp}[0, 0], x_{sp}[0, 1], \ldots, x_{sp}[0, M-1], \ldots, x_{sp}[N-1, 0],$$
$$x_{sp}[N-1, M-1]]^T,$$

and $$x_d = [x_d[0, 0], x_d[0, 1], \ldots, x_d[N-1, 0], x_d[N-1, 1], \ldots,$$
$$x_d[N-1, M-1]]^T.$$

Define $P_T$ as the total transmission power and $\alpha$ ($\alpha \in (0, 1)$) as the pilot power allocation ratio. It suggests that $\alpha P_T$ and $(1-\alpha)P_T$ are used for transmitting pilots and data symbols, respectively. As a result, the transmitted OTFS signal vector x can be expressed as $$x = \sqrt{\alpha}\, x_{sp} + \sqrt{1-\alpha}\, x_d,$$

where $\alpha$ is the pilot power allocation ratio. Typically, if more power is used for pilot transmission, i.e., $\alpha$ is large, the channel estimation performance can be expected to be better. However, less power would remain for data transmission, giving rise to low data signal-to-noise-ratio (SNR) and thus low reliability. Instead, the pilots allocated with less power, i.e., $\alpha$ is small, would lead to a poor channel estimate and signal estimate. Therefore, a suitable power allocation between data and pilots is of utter importance in achieving high reliability.

The received OTFS vector y in the delay-Doppler domain is defined as $$y = [y[0, 0], y[0, 1], \ldots, y[0, M-1], \ldots, y[N-1, 0], y[N-1, 1], \ldots,$$
$$y[N-1, M-1]]^T.$$

After propagating through the doubly-selective fading channel with Doppler spread, the received signal vector y, which can be considered the sum of the vectors representing the received data and the pilots superimposed thereon, respectively, in the delay-Doppler domain could be written as $$y = \sqrt{\alpha}\,(F_N \otimes I_M)\left|H_t(F_N^H \otimes I_M)x_{sp} + \sqrt{1-\alpha}\,(F_N \otimes I_M)H_1(F_N^H \otimes I_M)x_d + w,\right.$$

where $F_N$ is the discrete Fourier transform (DFT) matrix, $I_M$ the M×M identity matrix, w the additive white Gaussian noise (AWGN) vector, and $H_t$ the MN×MN time varying channel matrix in the time domain defined as, $$H_t = \begin{bmatrix} h[0,0] & 0 & \ldots & 0 & h[0,L] & h[0,L-1] & \ldots & h[0,1] \\ h[1,1] & h[1,0] & 0 & \ldots & 0 & h[1,L] & \ldots & h[1,2] \\ \vdots & \ddots & \ddots & & \ddots & \ddots & \ddots & \vdots \\ h\{L,L] & h[L,L-1] & \ldots & h[L,1] & h[L,0] & 0 & \ldots & 0 \\ \vdots & \ddots & \ddots & \ddots & & \ddots & \ddots & \vdots \\ 0 & \ldots & 0 & h[MN-1,L] & h[MN-1,L-1] & \ldots & h[MN-1,1] & h[MN-1,0] \end{bmatrix}$$

with h[t, l] denoting the channel gain of the l-th path at the t-th time instant, t=0, 1, . . . , MN−1, and l=0, 1, . . . , L. L denotes the channel length. Define $$f_{max} = \frac{f_c \upsilon}{c}$$

as the maximum Doppler frequency, where $f_c$ is the carrier frequency, v the vehicle speed, and c the speed of light. Considering Jakes' model with U-shaped Doppler spectrum, the correlation function of the l-th path is defined as $J_0(2\pi n f_{max} T_s)$, where $J_0(\bullet)$ denotes the zeroth-order Bessel function of the first kind, and $T_s$ the sampling period.

The use of the delay-Doppler channel representation is beneficial due to its compactness and sparsity. Since typically there is only a small number of physical reflectors with associated reflected signals, far fewer parameters are needed for channel modelling and estimation in the delay-Doppler domain than in the time-frequency domain.

Some known OTFS receivers make use of the properties of the delay-Doppler channel representation and apply a basis expansion model (BEM) for parameterizing the time varying channel as a weighted combination of a number of basis functions in OTFS, making use of the fact that BEM can help reducing the number of unknown channel coefficients to be estimated, as will be shown further down.

BEM has numerous kinds, including complex exponential BEM (CE-BEM), generalized CE-BEM (GCE-BEM), non-critically sampled CE-BEM (NCS-CE-BEM), polynomial BEM, discrete prolate spheroidal (DPS) BEM, Karhunen-Loeve BEM (KL-BEM), spatial-temporal BEM, etc.

Among them, CE-BEM is the simplest model which, however, suffers a significant modelling error. On the positive side, CE-BEM and its variants GCE-BEM and NCS-CE-BEM are independent on the channel statistics. GCE-BEM enjoys simplicity and analytical tractability. However, its BEM order should be doubled at least, i.e., T≥2, for approaching near-optimal performance, where T is the modelling resolution parameter. Specifically, the GCE-BEM with T=1 suffers from a rather big modelling error, while the counterpart with T>1 enjoys low modelling error, albeit at the expense of large BEM order and high complexity.

In OTFS receivers using variants of the CE-BEM channel estimation, the pilot overhead, in order to achieve acceptable performance, must be increased with increasing maximum channel delay and Doppler spread. Such increase will evidently further reduce the spectral efficiency. While many OTFS channels may have a known maximum channel delay and possibly also maximum known Doppler spread, real-life systems will be designed for even higher maximum delay and Doppler spread, for providing some safety margin. This will even further reduce the spectral efficiency in such practical systems.

KL-BEM with a good knowledge of channel statistics is the most accurate BEM model. However, its performance is suboptimal when the assumed channel properties differ from the real channel.

The solution proposed herein, using superimposed pilots for an initial channel estimation and detected symbols as additional pseudo pilots in repeated iterative channel estimations, provides a way to benefit from the accuracy of the KL-BEM approach.

An important step is determining the most suitable basis functions for the KL-BEM channel estimation.

By exploiting the KL-BEM, $H_t$ can be further expressed as $$H_t = \sum_{Q=0}^{Q=1} \mathrm{diag}\{b_q\}O_q + E$$

where Q is the BEM order, i.e., the number of BEM basis functions, which is usually given by $$Q \geq 2\left|\frac{N f_{max}}{\Delta f}\right| + 1$$

and E is the channel modelling error matrix. $b_q$ and $C_q$ are defined as the q-th BEM basis function and its corresponding BEM coefficient, with q=0, 1, . . . , Q−1. Circulant matrix $C_q$ can be expressed as $$C_q = \begin{bmatrix} c_q[0] & 0 & \ldots & 0 & c_q[L] & c_1[L-1] & \ldots & c_q[1] \\ c_q[1] & c_q[0] & 0 & \ldots & 0 & c_q[L] & \ldots & c_q[2] \\ \vdots & \ddots & \ddots & \ddots & \ddots & \ddots & \ddots & \vdots \\ c_q[L] & c_q[L-1] & \ldots & c_q[1] & c_q[0] & 0 & \ldots & 0 \\ \vdots & \ddots & \ddots & \ddots & \ddots & \ddots & \ddots & \vdots \\ 0 & \ldots & 0 & c_q[L] & c_q[L-1] & \ldots & c_q[1] & c_1[0] \end{bmatrix}.$$

Thanks to the discrete Fourier Transform (DFT) concept, the circulant matric $C_q$ can be represented by $$C_q = F_{MN}^H \mathrm{diag}\{F_{MN \times L} c_q\}F_{MN}$$

where $C_q=[c_q[0], c_q[1], . . . , c_q[L],]^T$ is the q-th BEM coefficient vector, $F_{MN}$ is the MN-point DFT matrix, and $F_{MN \times L}$ corresponds to the first (L+1) columns of $F_{MN}$. As a result, H, can be expressed by $$H_t = \sum_{q=0}^{Q-1} \text{diag}\{b_q\} F_{MN}^H \text{diag}\{F_{MN \times L} c_q\} F_{MN} + E.$$

Thus, by applying BEM to OTFS, it is possible to reduce the number of unknown time varying channel coefficients from MN(L+1) to Q(L+1).

In the following, the optimal BEM basis functions will be investigated by taking the l-th channel path as an example. Define $h_l$ and $\hat{h}_l$ as the channel and channel estimate of the l-th path, respectively. The mean square error (MSE) of the channel estimation is defined by $$MSE_{Channel} = \frac{\mathbb{E}\left\{\sum_{l=0}^{L} \left\| h_l - \hat{h}_l \right\|^2\right\}}{L \, | + 1},$$

which is equivalent to $$MSE_{Channel} = \frac{\mathbb{E}\left\{\sum_{l=0}^{L} \left\{\text{trace}\left(I_{MN} - BB^{|H|}\right) R_{HH}\right\}\right\}}{L+1},$$

where $B=[b_0, b_1, \ldots, b_Q]$, and $R_{HH}$ is a channel correlation matrix determined by $J_0(2\pi n f_{max} T_s)$. Therefore, the optimal BEM basis functions can be found by $$B_{KL} = \min_{\overline{B}} \frac{\mathbb{E}\left\{\sum_{l=0}^{L} \left\{\text{trace}\left(I_{MN} - \tilde{B}\overline{B}^H\right) R_{HH}\right\}\right\}}{L+1},$$

which is equivalent $$B_{KL} = \max_{\overline{B}} \frac{\mathbb{E}\left\{\sum_{l=0}^{L} \left\{\text{trace}\left(\tilde{B}\overline{B}^H R_{HH}\right)\right\}\right\}}{L+1}.$$

Hence, the optimal BEM basis functions B can be found by choosing the Q eigenvectors corresponding to the Q largest eigenvalues, i.e., $$B_{KL} = V(:, 1:Q),$$

where V is the eigenvector of $R_{HH}$. As a result, $$H_i = \sum_{q=0}^{Q-1} \text{diag}\{b_{KL,q}\} F_{MN}^H \text{diag}\{F_{MN \times L} e_q\} F_{MN} + E,$$

where $b_{KL,q}$ is the selected optimized BEM basis function from $B_{KL}$.

Thus, the received signal vector y in the delay-Doppler domain defined further above can now be written as $$y = \sqrt{\alpha} \sum_{q=0}^{Q-1} (F_N \otimes I_M) \text{diag}\{b_{KL,q}\} F_{MN}^H \text{diag}\{F_{MN \times L} c_q\} F_{MN} \left(F_N^H \otimes I_M\right) x_{sp} +$$

$$\sqrt{1-\alpha} \sum_{q=0}^{Q-1} (F_N \otimes I_M) \text{diag}\{b_{KL,q}\} F_{MN}^H \text{diag}\{F_{MN \times L} c_q\} F_{MN} \left(F_n^H \otimes I_M\right) x_d +$$

$$w + z$$

where z is the error to the received OTFS signal incurred by KL-BEM modelling. It is noteworthy that the previous equation is equivalent to $$y = \sqrt{\alpha} \sum_{q=0}^{Q-1} (F_N \otimes I_M) \text{diag}\{b_{KL,q}\} F_{MN}^H \text{diag}\left\{F_{MN}\left(F_N^H \otimes I_M\right) x_{sp}\right\} F_{MN \times L} c_q +$$

$$\sqrt{1-\alpha} \sum_{q=0}^{Q-1} (F_N \otimes I_M) \text{diag}\{b_{KL,q}\} F_{MN}^H \text{diag}\left\{F_{MN}\left(F_N^H \otimes I_M\right) x_d\right\} F_{MN \times L} c_q +$$

$$w + z.$$

The representation of the received signal vector y as a combination of a vector $y_d$ representing the data and a vector $y_{sp}$ representing the superimposed pilots, plus noise and error, permits treating the data symbols as interference for the channel estimation. As opposed to the pilots, data signals may have a high variability and may appear to have a rather random nature, which could be further emphasised using a suitable arrangement of the data symbols in the two-dimensional OTFS transmission frame, in case repetitive structures are present in the data signals.

This opens the path for the receiver and the method of receiving in accordance with an aspect of the present invention, in which a KL-BEM OTFS receiver uses a staged iterative channel estimation matched to the needs of KL-BEM.

The proposed KL-BEM OTFS receiver comprises two stages: In a first stage, treating the transmitted data as interference, the KL-BEM channel is initially estimated using only the superimposed pilots. The superimposed pilots are then removed or cancelled from the received signal, and the initial estimation of the transmitted symbols using equalisation, e.g., by a message passing (MP) algorithm, is carried out. Other equalisers may also be used, including but not limited to low-complexity zero forcing equaliser, minimum mean square error (MMSE) equaliser, and linear MMSE equaliser.

In a second, iterative stage, the data symbols estimated or detected by the MP algorithm are used as additional pseudo pilots, along with the superimposed pilots, to further refine the channel estimation in an iterative manner. The number of iterations may be fixed or variable, depending on a chosen termination criterion.

The combination of the two stages provides both high accuracy and low complexity.

Using the idea of treating the data as noise for the channel estimation based on the superimposed pilots, the received signal vector y in the delay-Doppler domain defined further above can now be written as $$y = \sqrt{\alpha} \underbrace{\sum_{q=0}^{Q-1} (F_N \otimes I_M) \text{diag}\{b_{KL,q}\} F_{MN}^H \text{diag}\left\{F_{MN}\left(F_N^H \otimes I_M\right) x_{sp}\right\} F_{MN \times L} c_q}_{A_{sp,q}} +$$

-continued $$\sqrt{1-\alpha} \underbrace{\sum_{q=0}^{Q-1}(F_N \otimes I_M)\mathrm{diag}\{b_{KL,q}\}F_{MN}^H\mathrm{diag}\{F_{MN}(F_N^H \otimes I_M)x_d\}F_{MN \times L}c_q}_{Interference} +$$

$$w+z.$$

The part representing the superimposed pilots can be represented by $A_{sp,q}$, and the interference can be represented by $A_{d,q}$. The received signal vector y in the delay-Doppler domain can, thus, be written as $$y = \sqrt{\alpha} \sum_{q=0}^{Q-1} A_{sp,q} c_q + \underbrace{\sqrt{1-\alpha} \sum_{q=0}^{Q-1} A_{d,q} c_q}_{Interference}$$

The KL-BEM coefficient vector defined as $c=[c_1{}^T, c_2{}^T, \ldots, c_{Q-1}{}^T]$ can be obtained initially by superimposed pilots as follows:

$$\hat{c}^0 = \frac{(A_{sp})^1 y}{\sqrt{\alpha}}$$

with $A_{sp} = [A_{sp,0}, A_{sp,1}, \ldots, A_{sp,Q-1}]$.

With the BEM coefficient estimate $\hat{c}^0$, the channel matrix $H_t$ can be determined by $$H_t^0 = \sum_{q=0}^{Q-1} \mathrm{diag}\{b_{KL,q}\}F_{MN}^H \mathrm{diag}\{F_{MN \times L}c_q^0\}F_{mN} + E.$$

Using the initial channel estimation $\hat{H}_t{}^0$ the superimposed pilots are then removed from the received OTFS signal vector y yielding $$\hat{y}_d^0 = y - \sqrt{\alpha}(F_N \otimes I_M)\hat{H}_t^0(F_N^H \otimes I_M)x_{sp}.$$

and a first estimation of the transmitted data symbols is performed on the estimated received data signal $\hat{y}_d{}^0$ using the initial channel estimate $\hat{H}_t{}^0$. The estimation of the data $\hat{x}_d{}^0$ can, e.g., be had using an MP equalisation algorithm. Note that the superscript $^0$ indicates that this is the initial estimation based exclusively on superimposed pilots.

In the iterative stage the previously estimated data symbols $\hat{x}_d{}^{i-1}$ are fed back to the KL-BEM channel estimator, where they are used, in one or more subsequent iterations i of the channel estimation and equalisation, as pseudo pilots along with the superimposed pilots, for enhancing the channel estimation and equalisation. The result of the next iteration of the channel estimation is then used for removing the superimposed pilots from the received signal vector y, and the resulting data-only signal vector is subjected to a further equalisation, i.e., estimation of the transmitted data symbols.

Defining $\hat{A}_d^{i-1} = [\hat{A}_{d,0}^{i-1}, \hat{A}_{d,1}^{i-1}, \ldots, \hat{A}_{d,Q-1}^{i-1}]$ with -continued $$\hat{A}_{d,q}^{i-1} = (F_N \otimes I_M)\mathrm{diag}\{b_{KL,q}\}F_{MN}^H\mathrm{diag}\{F_{MN}(F_N^H \otimes I_M)\hat{x}_0^{i-1}\}F_{MN \times L},$$

the received signal vector y in the delay-Doppler domain defined further above can now be written as $$y = \underbrace{\left(\sqrt{\alpha}A_{sp} + \sqrt{1-\alpha}\,\hat{A}_d^{i-1}\right)}_{A^{i-1}}c + w + z.$$

The refined KL-BEM coefficient vector c is obtained as $c^i=(A^{i-1})^{\dagger}y$.

Similarly, the superimposed pilots are removed from the received OTFS signal, yielding $$\hat{y}_d^i = y - \sqrt{\alpha}(F_N \otimes I_M)\hat{H}_t^i(F_N^H \otimes I_M)x_{sp}.$$

Finally, with the estimated received data signal $\hat{y}_d{}^i$ and the channel estimate $\hat{H}_t{}^i$, the estimated data signal, denoted as $\hat{x}_d{}^i$ can be easily identified by the MP equalisation algorithm. The aforementioned steps from refined channel estimation to refined equalisation are repeated iteratively until a termination criterion is met, e.g., steady performance is achieved.

In accordance with a first aspect of the present invention, a receiver for an OTFS transmission system comprises a first receiver-side transformation unit and a second receiver-side transformation unit. The receiver is adapted to receive a time-domain signal representing a communication frame comprising data signals and pilots superimposed thereon in the delay-Doppler domain, transmitted over a practical communication channel, i.e., a communication channel subject to Doppler spread, at an input of the first receiver-side transformation unit. The first receiver-side transformation unit outputs a two-dimensional representation of the received communication frame in the time-frequency domain. The output of the first receiver-side transformation unit is provided to an input of the second receiver-side transformation unit, which outputs a two-dimensional representation of the received communication frame comprising data signals and superimposed pilots in the delay-Doppler domain. The output of the second receiver-side transformation unit is provided to a first input of a KL-BEM channel estimation unit, a representation of the superimposed pilots, i.e., the pilots superimposed on the two-dimensional transmission frame in the delay-Doppler domain, being provided to a second input of which. Initially, the channel estimation uses only the superimposed pilots for the channel estimation. The KL-BEM channel estimation unit outputs an initial estimation $\hat{H}_t{}^{i=0}$ of the time-domain channel matrix. The initial estimation $\hat{H}_t{}^{i=0}$ of the time-domain channel matrix, as well as the output of the second receiver-side transformation unit, are provided to a pilot removal unit which, based on the initial estimation of the time-domain channel matrix $\hat{H}_t{}^{i=0}$, removes the superimposed pilots from the received signal output by the second receiver-side transformation unit. The remaining signal, which represents an initial estimation of the only the data comprised in the received two-dimensional transmission frame in the delay-Doppler domain, is input to an equaliser, which outputs an initial estimated set of data symbols $\hat{x}_d{}^{i=0}$. The equaliser may use a message passing (MP) algorithm. The output of the equaliser, i.e., the initial estimated set of data symbols $\hat{x}_d{}^{i=0}$, is fed back to the KL-BEM channel estimation unit, which uses the initial estimated set of data symbols $\hat{x}_d^{\,i=0}$, along with the received signal output from the second receiver-side transformation unit, for a first re-iteration of the channel estimation. In the re-iteration, in which all previously described steps are repeated, the initial estimated set of data symbols $\hat{x}_d^{\,i=0}$ is used as pseudo pilots, in addition to the superimposed pilots. The first re-iteration produces a further estimation of the time-domain channel matrix $\hat{H}_t^{\,i=1}$, a further estimation of the received data-only signal, and a further estimated set of data symbols $\hat{x}_d^{\,i=1}$. The process steps, i.e., KL-BEM channel estimation, removal of superimposed pilots, and equalisation, are iteratively repeated until a termination criterion is met.

Termination criteria may include convergence of the outputs of the equaliser unit. Such convergence may be assumed, e.g., when the bit error rate of the decoded output of the equaliser unit for two subsequent iterations is below a predetermined threshold. The threshold may be, e.g., a difference in bit error rates that is smaller than $10^{-6}$. Another conceivable termination criterion may be a predetermined number of iterations. It is also possible to set a maximum number of iterations after which the iteration is terminated, but to terminate the iteration earlier when the bit error rate for two subsequent iterations lies below the predetermined threshold before the maximum number of iterations is reached.

In one or more embodiments of the receiver the first receiver-side transformation unit is adapted to perform a finite Fourier transform, an inverse Heisenberg-, or Wigner-transform.

In one or more embodiments of the receiver the second receiver-side transformation unit is adapted to perform a symplectic finite Fourier transform.

In one or more embodiments of the receiver the equaliser performs a message passing, a zero-forcing and/or a minimum mean square error equalisation.

One or more embodiments of the receiver further comprise a control unit that is adapted to receive information about the absolute speed and direction of the receiver over ground, the absolute speed and direction of the transmitter over ground and/or the relative speed between the receiver and the transmitter. The received information is passed to the KL-BEM channel estimation unit, for determining KL-BEM parameters to be used in the channel estimation. The KL-BEM parameters may, inter alia, include a differential-speed dependent channel correlation matrix, which will lead to different BEM basis functions, as will be elucidated in greater detail further below.

In one or more embodiments of the receiver the KL-BEM order for the initial channel estimation is different from the KL-BEM order for subsequent iterations. Preferably, the KL-BEM order for subsequent iterations is higher than that for the initial channel estimation. The KL-BEM order may be increased with an increasing number of iterations, as the increasing number of already estimated data symbols, now serving as pseudo pilots, no longer interfere with the channel estimation.

In one or more embodiments of the receiver the power allocation ratio between data and pilots may change between transmission frames, and the control unit is adapted to receive information about the power allocation ratio used for a transmission frame. The received information is passed to the KL-BEM channel estimation unit and/or to the pilot removal unit.

A wireless device in accordance with a third aspect of the present invention comprises a receiver for an OTFS transmission system as described hereinbefore.

In accordance with a second aspect of the present invention, a method of receiving a binary data sequence over a practical OTFS communication channel susceptive to doubly-selective fading comprises receiving a continuous time-domain signal representing a communication frame comprising data signals and pilots superimposed thereon over the communication channel. The method further comprises transforming, in a first receiver-side transformation unit, the continuous time-domain signal representing the communication frame into a two-dimensional arrangement of information symbols in the time-frequency domain that is available at an output of the first receiver-side transformation unit. In a next step of the method the two-dimensional arrangement of information symbols comprising pilot and data signals in the time-frequency domain is transformed, in a second receiver-side transformation unit, into a two-dimensional communication frame comprising pilot and data signals in the delay-Doppler domain, which is made available at an output of the second receiver-side transformation unit. For obtaining a first estimation of the time-domain channel matrix $\hat{H}_t^{\,i=0}$ at an output of a KL-BEM channel estimation unit the signal output from the second receiver-side transformation unit and a signal $x_p$ representing the superimposed pilots are provided to the KL-BEM channel estimation unit. In a next step of the method, the first estimation of the time-domain channel matrix $\hat{H}_t^{\,i=0}$ as well as the signal output from the second receiver-side transformation unit are provided to a pilot removal unit, for removing the superimposed pilots from the received signal y output from the second receiver-side transformation unit. The signal output from the pilot removal unit is provided to an equaliser unit, for obtaining a first estimated set $\hat{x}_d^{\,i=0}$ of data signals at an output of the equaliser unit. The method further comprises feeding back the first estimated set $\hat{x}_d^{\,i=0}$ of data signals to the input of the KL-BEM channel estimation unit, which repeats estimating the time-domain channel matrix $\hat{H}_t^{\,i\geq1}$, using the estimated set $\hat{x}_d^{\,i=0}$ as pseudo pilots. The newly estimated time-domain channel matrix $\hat{H}_t^{\,i\geq1}$ is then used for removing the superimposed pilots, and a further estimation of a set $\hat{x}_t^{\,i\geq1}$ of data signals is performed. Feeding back of the latest estimation of a set $\hat{x}_t^{\,i\geq1}$ of data signals is iteratively repeated until a termination criterion is met. Thus, after each estimation of a set $\hat{x}_d^{\,i}$ of data signals, the estimation result is checked against such termination criterion.

In one or more embodiments of the method, transforming the continuous time-domain signal representing the communication frame into a two-dimensional arrangement of information symbols in the time-frequency domain comprises subjecting the continuous time-domain signal representing a communication frame to a finite Fourier transform, an inverse Heisenberg-, or Wigner-transform.

In one or more embodiments of the method, transforming the two-dimensional arrangement of information symbols comprising data signals and superimposed pilots in the time-frequency domain into a two-dimensional communication frame comprising data signals and superimposed pilots in the delay-Doppler domain comprises subjecting the two-dimensional arrangement of information symbols comprising data signals and superimposed pilots in the time-frequency domain to a symplectic finite Fourier transform.

In one or more embodiments of the method, obtaining an estimated set of at least data signals in the equaliser unit comprises subjecting the signal output from pilot removal unit to a message passing, a zero-forcing and/or a minimum mean square error equalisation.

In one or more embodiments the method further comprises receiving, in a control unit, information about the absolute speed and direction of the receiver over ground, the absolute speed and direction of the transmitter over ground and/or the relative speed between the receiver and the transmitter, and determining KL-BEM parameters to be used in the channel estimation based thereon. The KL-BEM parameters may, inter alia, include a differential-speed dependent channel correlation matrix, which will lead to different BEM basis functions.

To this end, the receiver may store previous channel estimates and associated differential speeds. The channel estimates are used for calculating the channel correlation matrix to be used for the next channel estimation. Note that unlike the channel, the channel correlation matrix changes slowly over time. Denote H as the channel estimate for the j-th OTFS frame. The channel correlation matrix is calculated by $$R_{HH} = \frac{1}{N_s} \sum_{j=1}^{N_s} \hat{H}_j \hat{H}_j^H$$

where Ns is the number of previous channel estimates.

In the beginning there are no previous channel estimates. In this case Jakes' model may be adopted to determine a channel correlation matrix. Jakes' model permits calculating the channel correlation matrix based, inter alia, on the differential speed v, carrier frequency $f_c$, using $J_0(2\pi n f_{max} T_s)$, where $J_0(\bullet)$ denotes the zeroth-order Bessel function of the first kind, $T_s$ the sampling period, and $$f_{max} = \frac{f_c v}{c}.$$

Once one or more channel estimates have been determined, the channel correlation matrix can subsequently be updated using this information, as described above.

KL-BEM basis functions may be obtained by using the differential speed v, carrier frequency $f_c$, and the channel correlation matrix $R_{HH}$. Note that a dependency between the number of KL-BEM basis functions Q and the differential speed v and the carrier frequency $f_c$ exists. It is reminded that the KL-BEM basis functions correspond to the Q eigenvectors of the channel correlation matrix $R_{HH}$, which correspond to its Q largest eigenvalues.

The method of receiving may be represented by computer program instructions which, when executed by a microprocessor, cause the computer and/or control hardware components of a receiver of an OTFS transmission system as presented hereinbefore, respectively, to execute the method of receiving as presented hereinbefore.

The computer program instructions may be retrievably stored or transmitted on a computer-readable medium or data carrier. The medium or the data carrier may by physically embodied, e.g., in the form of a hard disk, solid state disk, flash memory device or the like. However, the medium or the data carrier may also comprise a modulated electromagnetic, electrical, or optical signal that is received by the computer by means of a corresponding receiver, and that is transferred to and stored in a memory of the computer.

The various elements of the receiver presented above may be implemented in hardware, as software modules, or combinations thereof, i.e., hardware that is controlled and/or parameterized through software.

The effectiveness of using KL-BEM channel modelling for channel estimation in the receiver will be described in the following in comparison with an existing superimposed pilot-aided OTFS receiver proposed by H. B. Mishra, P. Singh, A. K. Prasad, and R. Budhiraja in: "Iterative channel estimation and data detection in OTFS using superimposed pilots," Proc. IEEE Int. Conf. Commun. (ICC) Workshops, Montreal, QC, Canada, 2021, pp. 1-6., and a BEM OTFS receiver proposed by Y. Liu, Y. Guan, and D. González G. in: "Near-optimal BEM OTFS receiver with low pilot overhead for high mobility communications," submitted to IEEE Trans. Commun., the latter being the basis for German patent application no. DE 10 2021 126 321. It is noteworthy that the dedicated pilot overhead of the BEM-OTFS receiver is approximately 11%, while that of the KL-BEM OTFS receiver according to an aspect of the invention and the existing superimposed pilot-aided OTFS receiver is 0.

It is assumed that each OTFS frame has M=128 delay bins, each of which consists of N=16 Doppler bins. The carrier frequency is $f_c$=4 GHZ, and the subcarrier spacing is $\Delta f$=15 KHz. A 5G TDL-E model as proposed in 3GPP TR 38.901, "Study on channel model for frequencies from 0.5 to 100 GHZ," 2017, with channel length L=21 and Jakes' Doppler spectrum is assumed. The vehicle speed is v=125 km/h, with a corresponding normalised Doppler spread given by $f_{max} T_s$=0.03. The pilot power allocation ratio $\alpha$ is 10% for FIGS. 4, 5 and 6, while the pilot power allocation ratio $\alpha$ is a variable in FIG. 7. Further, it is assumed that symbols are modulated using quadrature phase shift keying (QPSK).

The channel modelling mean square error (MSE) is defined as $$MSE_{H_t}^i = \frac{\mathbb{E}\{(H_t^i - H_t)^2\}}{MN(L+1)},$$

with $\hat{H}_t^i$ as the i-th channel estimation of the iterative process.

FIG. 4 shows the initial BER performance by superimposed pilots as a function of the BEM order $Q_s$ with SNR=12 dB. The suitable BEM order in the initial superimposed pilot-aided channel estimation and equalisation is found to be 2. The KL-BEM channel estimator with smaller BEM order $Q_s$ is unable to accurately model the time varying channel. Accordingly, the KL-BEM OTFS receiver with $Q_s$=1 in the initial SP-aided channel estimation and equalisation has a poor BER performance. The initial BER worsens as $Q_s$ increases from 3 to 5. The reason is that more BEM coefficients must be estimated using the superimposed pilots. As this gives interference from data symbols more influence, the channel estimation performance degrades. Note that regarding the proposed KL-BEM OTFS receiver, the BEM order $Q_s$=2 is exploited in the initial SP-aided channel estimation, while Q=2[$Nf_{max}/\Delta f$]+1=3 is used in the iterative data-aided channel estimation.

FIG. 5A shows the MSE of channel estimation and FIG. 5B shows the BER performance of the proposed KL-BEM OTFS receiver, in comparison to the existing BEM-OTFS receiver proposed by Y. Liu, Y. Guan, and D. González G. as "Near-optimal BEM OTFS receiver with low pilot overhead for high-mobility communications," Submitted to IEEE Trans. Commun., and the superimposed pilot-aided OTFS receiver proposed by H. B. Mishra, P. Singh, A. K. Prasad, and R. Budhiraja, as "Iterative channel estimation and data detection in OTFS using superimposed pilots," in Proc. IEEE Int. Conf. Commun. (ICC) Workshops, Montreal, QC, Canada, 2021, pp. 1-6.

As the existing superimposed pilot-aided OTFS receiver is intended for channels with Doppler shift rather than Doppler spread, it has the worst performance. The proposed KL-BEM OTFS receiver without utilizing the dedicated pilots slightly outperforms the existing BEM-OTFS receiver with the dedicated pilot overhead of 11% in terms of both MSE of channel estimation and BER performance. It also has a BER performance that is close to the lower bound obtained by assuming perfect channel estimation.

FIG. 6 shows the convergence performance of the proposed KL-BEM OTFS receiver and the existing BEM-OTFS receiver with SNR=12 dB It is easily observed that both receivers converge fast, within 3 iterations. It is noteworthy, however, that the proposed KL-BEM OTFS receiver does not require dedicated pilots, offering higher spectral efficiency than that of the existing BEM-OTFS receiver.

FIG. 7 shows the BER performance of the proposed KL-BEM OTFS receiver and existing superimposed pilot-aided OTFS receiver as a function the pilot power allocation ratio with SNR=12 dB. The proposed KL-BEM OTFS receiver demonstrates a superior BER performance over the existing superimposed pilot-aided OTFS receiver regardless of the pilot power allocation ratio. The optimum pilot power allocation ratio for the proposed KL-BEM OTFS receiver is 10%, which results in the minimum BER.

The two-stage channel estimation in the receiver, implementing an initial channel estimation followed by removing the superimposed pilots and an initial equalisation and symbol estimation, and the iterative repetition thereof additionally using the previously estimated symbols as pseudo pilots for refining the channel estimation, permits designing an OTFS communication frame without dedicated pilots and thus contributing to a high spectral efficiency. The refined channel estimate after each iteration results in an enhanced equalisation, which results in more pseudo pilots becoming available. The aforementioned refined channel estimation and equalisation are repeated iteratively until a termination criterion is reached, e.g., a predetermined number of iterations or an improvement over the previous equalisation that lies below a predetermined value. This results in near-optimal performance, approaching the lower bound, and provides higher reliability of the symbol estimations. As the superimposed pilots require only a comparatively small share of the total transmission power, the transmitted symbols can be estimated with higher reliability.

The KL-BEM OTFS receiver for OTFS transmissions with superimposed pilots presented hereinbefore can be used with great advantage for high-mobility communications with long delay spread channel. Unlike existing receivers that are not optimized or even suitable for practical channels with Doppler spread, or require delays and Doppler shifts to be constant over multiple subsequent OTFS transmission frames, the proposed KL-BEM OTFS receiver does not need dedicated pilots for estimating delays, Doppler shifts or path gains, and does not need prior knowledge of these channel imperfections or distortions. Thus, the proposed KL-BEM OTFS receiver can cope well with rapidly changing Doppler spreads. Using low-power superimposed pilots instead results in higher spectral efficiency, and using KL-BEM provides significant performance improvement over existing designs in terms of MSE of channel estimation and BER. Near-optimal BER performance can be achieved by choosing a number of suitable KL-BEM basis functions, without increasing the computational complexity over that of existing designs. Choosing a suitable BEM order in the initial superimposed pilot-aided channel estimation the proposed KL-BEM OTFS receiver can provide fast convergence, requiring as few as 3 iterations, closely approaching the BER lower bound obtained by assuming perfect channel estimation.

BRIEF DESCRIPTION OF THE DRAWING

In the following section exemplary embodiments of the invention will be described in greater detail with reference to the drawing. In the drawing.

Throughout the figures identical or similar elements may be referenced using the same reference designators.

DESCRIPTION OF EMBODIMENTS

FIGS. 1, 2 and 4 to 7 have been described further above and will not be discussed again.

Figure 1:
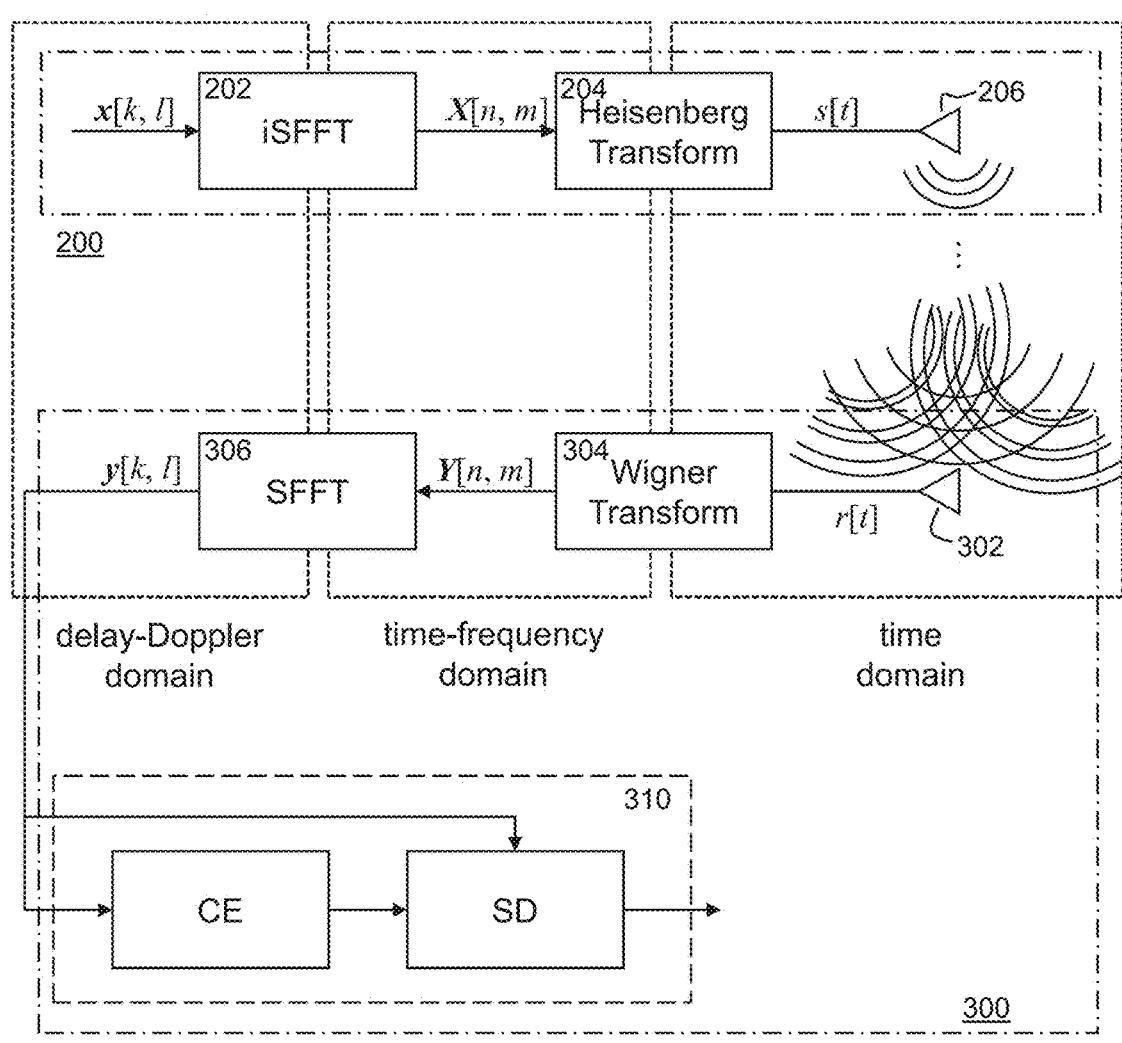
FIG. 1 shows a block diagram of a general OTFS transmission system, FIG. 2 schematically shows the superimposed pilots and their power allocation.
Figure 2:
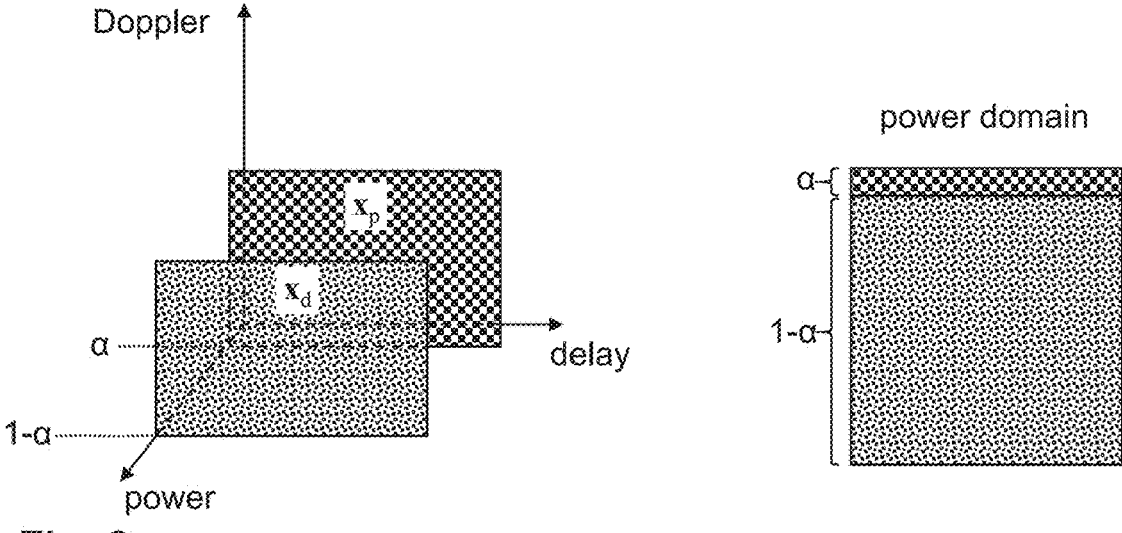
Figure 3:
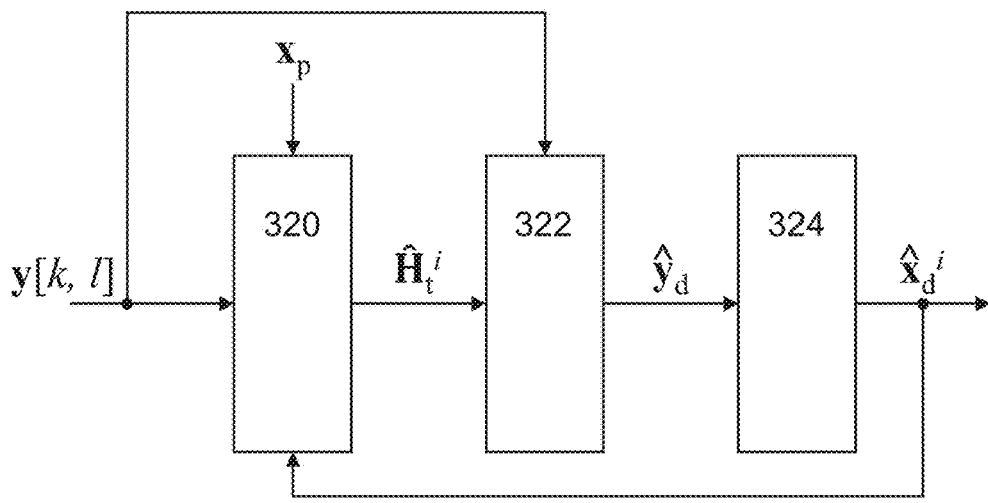
FIG. 3 shows a block diagram of channel estimation and equalisation of an exemplary receiver in accordance with an aspect of the present invention, shows a representation of the BER over the BEM-order of a KL-BEM FIG. 4 receiver in accordance with an aspect of the invention.
Figure 4:
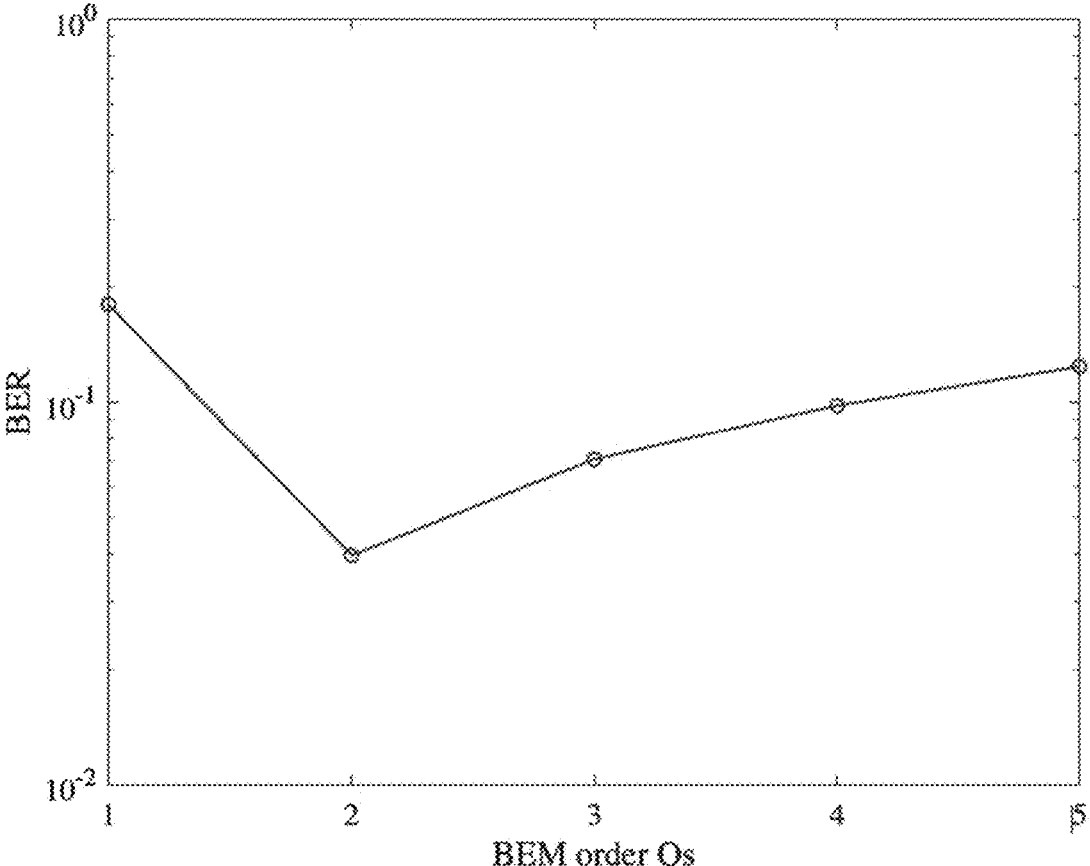
Figure 5:
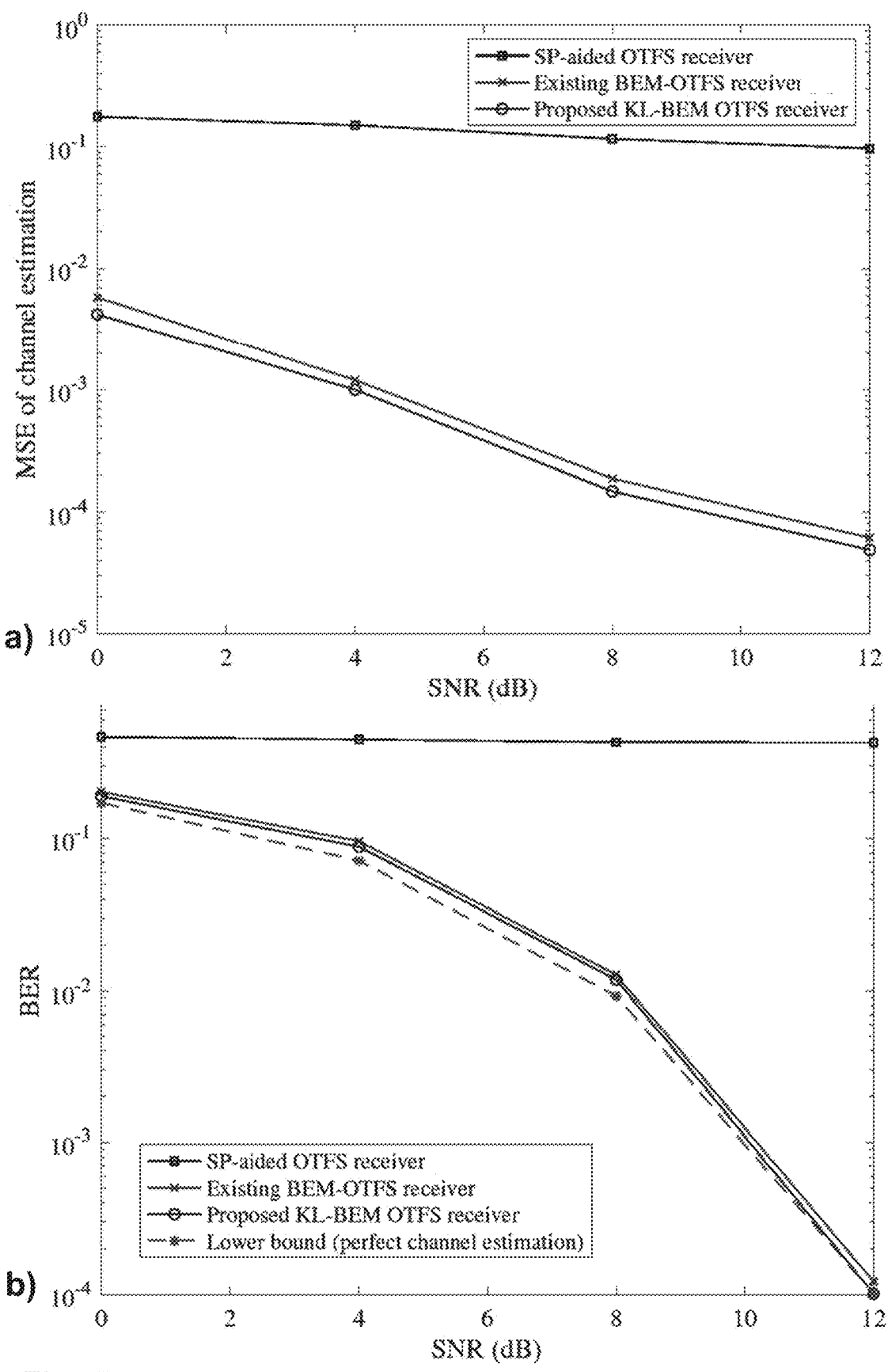
FIGS. 5A and 5B show a comparison of the channel estimation error and the BER over SNR for various OTFS receivers.
Figure 6:
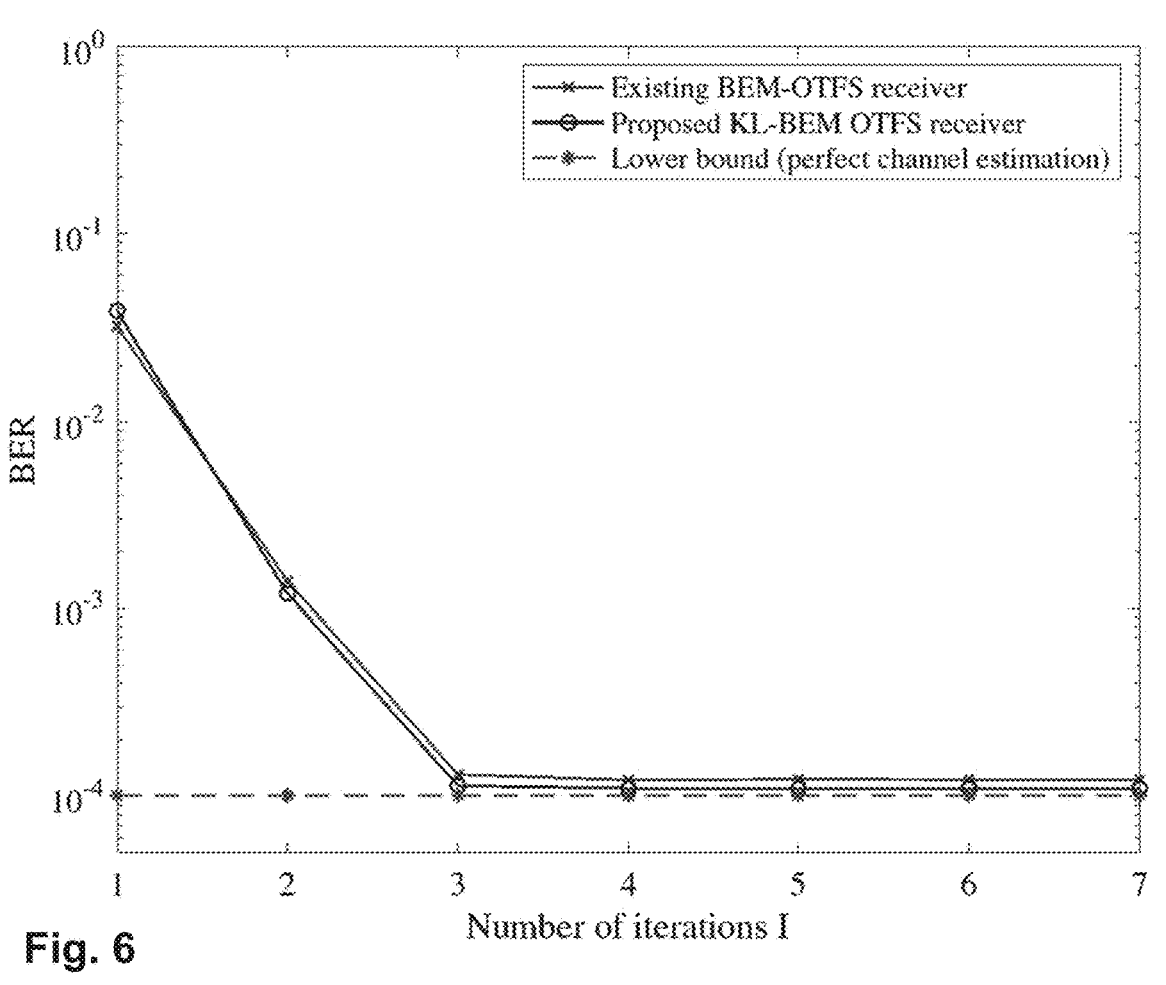
FIG. 6 shows a comparison of the BER over the number of iterations for various OTFS receivers.

FIG. 3 shows a block diagram of channel estimation and equalisation of an exemplary KL-BEM OTFS receiver in accordance with an aspect of the present invention. The channel estimation and equalisation replace the generic channel estimation and equalisation block 310 shown in FIG. 1. All other elements of the receiver 300 shown in FIG. 1, i.e., first and second receiver-side transformation units 304 and 306, respectively, are identical and are not shown in the figure.

The two-dimensional arrangement of data signals and superimposed pilots y[k, l] in the delay-Doppler domain output from the second receiver-side transformation unit 306 is applied at a first input of a KL-BEM channel estimation unit 320, and is also provided to an input of a pilot removal unit 322. KL-BEM channel estimation unit 320 performs an initial channel estimation based on the superimposed pilots $x_p$, the arrangement and power level of which are known to the KL-BEM channel estimation unit 320 and, in subsequent iterations, performs further channel estimations using estimations $\hat{x}_d^i$ of the transmitted symbols fed back to KL-BEM channel estimation unit 320 from equaliser unit 324 as pseudo pilots in addition to the superimposed pilots. The output of the KL-BEM channel estimation unit 320, which represents a channel estimation $\hat{H}_t^i$, is input to the pilot-removal unit 322. Based thereon, pilot removal unit 322 removes the superimposed pilots from the received signal vector y[k, l] in the delay-Doppler domain, and provides an estimation of a signal representing only the received data signal $\hat{y}_d^i$, to an input of equaliser unit 324. Equaliser unit 324 outputs estimations $\hat{x}_d^i$ of the transmitted data symbols. Iterations may be repeated until a termination criterion is fulfilled.

Figure 8:
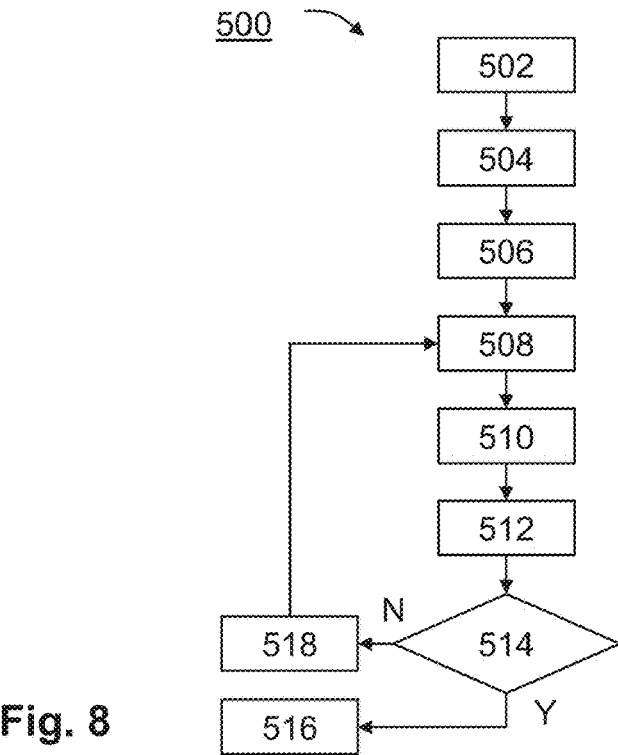
FIG. 8 shows a flow diagram of a method of receiving a binary data sequence over an OTFS communication channel susceptive to doubly-selective fading.
Figure 7:
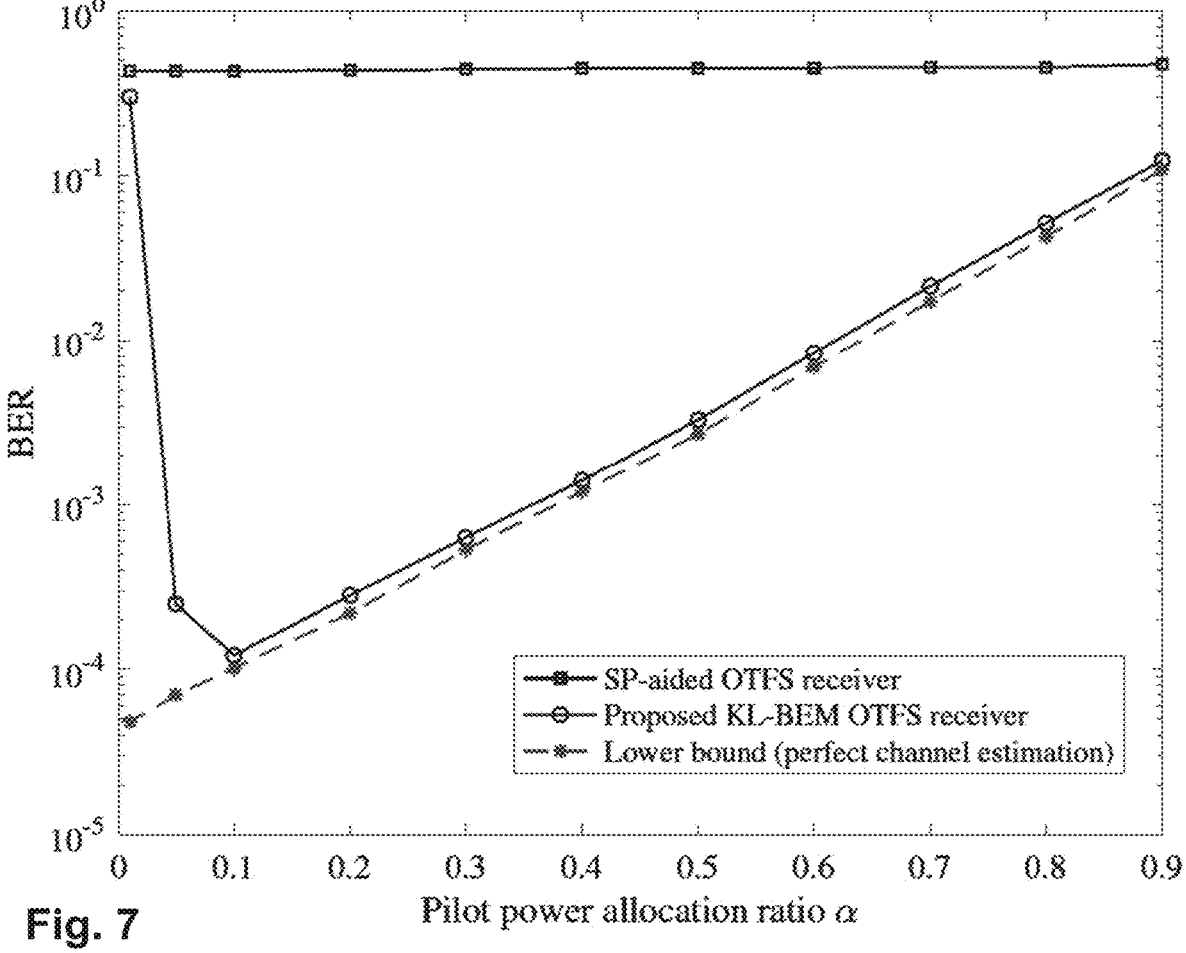
FIG. 7 shows the BER performance of the proposed KL-BEM OTFS receiver and existing superimposed pilot-aided OTFS receiver as a function the pilot power allocation ratio with SNR=12 dB.

FIG. 8 shows a flow diagram of a method 500 of receiving a binary data sequence over an OTFS communication channel susceptive to doubly-selective fading. In step 502 a continuous time-domain signal representing a communication frame is received over the communication channel. In step 504 the continuous time-domain signal representing the communication frame is transformed into a two-dimensional arrangement of information symbols in the time-frequency domain. In step 506 the two-dimensional arrangement of information symbols comprising data signals and superimposed pilots in the time-frequency domain is transformed into a two-dimensional communication frame comprising data signals and superimposed pilots in the delay-Doppler domain. In step 508 an initial estimation of a time-domain channel matrix is obtained in a KL-BEM channel estimation unit 320 that performs a channel estimation based on a Karhunen-Loeve basis expansion modelling of the time-varying communication channel, using only the superimposed pilots. In step 510 the pilots are removed from the two-dimensional communication frame comprising data signals and superimposed pilots in the delay-Doppler domain obtained in step 506. The resulting signal, which represents an estimation of only the transmitted data signals, is subjected to an equalisation in step 512, for obtaining an estimated set of data signals. Step 514 checks if a termination criterion is met, which in the positive case, "Yes"-branch of step 514, signals that the estimated received symbols can be output to a de-mapper, in step 516, and ultimately can be output as a received binary sequence. If the termination criterion is not met, "No"-branch of step 514, the set of data signals a previously estimated in step 512 is fed to the KL-BEM channel estimation unit 320 in step 518, and steps 508 to 514 are repeated. The further estimations of time-domain channel matrices are based on data signals previously estimated in step 512 and the superimposed pilots.

DEFINITIONS AND LIST OF REFERENCE NUMERALS (PART OF THE DESCRIPTION)

$f_c$ carrier frequency
$\Delta f$ subcarrier spacing
L channel length
M number of delay bins
N number of Doppler bins
$P_T$ total transmission power
$\alpha$ pilot power allocation ratio
$\lambda$ pilot overhead
$Q_S$ BEM order in the initial, low-order channel estimation
$Q_L$ BEM order in the subsequent, iterative channel estimation
AWGN additive white Gaussian noise
BEM basis expansion model
CE-BEM complex exponential BEM
GCE-BEM generalized CE-BEM
DFT discrete Fourier transform
KL-BEM Karhunen-Loeve BEM
MSE mean square error
OTFS orthogonal time frequency space
SNR signal-to-noise-ratio
BER bit error rate
OFDM orthogonal frequency division multiplexing
MP message passing SFFT finite symplectic Fourier transform
200 transmitter
202 first transmitter-side transformation unit
204 second transmitter-side transformation unit
206 antenna
300 receiver
302 antenna
304 first receiver-side transformation unit
306 second receiver-side transformation unit
310 channel estimation and equalisation block
320 KL-BEM channel estimation unit
322 pilot removal unit
324 equaliser unit
500 method of receiving
502 receiving continuous time-domain signal transforming continuous time-domain signal into a two-dimensional
504 arrangement of information symbols in the time-frequency domain
506 transforming a two-dimensional arrangement of information symbols in the time-frequency domain into a two-dimensional communication frame in the delay-Doppler domain
508 estimating time-domain channel matrix in a KL-BEM channel estimation unit
510 removing pilots
512 estimating symbols
514 termination criterion met?
516 output estimation to de-mapper
518 feed estimated symbols to KL-BEM channel estimation

The invention claimed is:

1. A receiver for an orthogonal time frequency space (OTFS) transmission system comprising a first receiver-side transformation unit and a second receiver-side transformation unit, a Karhunen-Loeve Basis Expansion Modeling (KL-BEM) channel estimation unit, a pilot removal unit, and an equaliser unit, wherein the receiver is adapted to receive, at an input of the first receiver-side transformation unit, a time-domain signal representing a communication frame comprising data signals and pilots superimposed thereon, transmitted over a communication channel, wherein the first receiver-side transformation unit is adapted to output a two-dimensional representation of the received communication frame in the time-frequency domain, wherein the output of the first receiver-side transformation unit is provided to an input of the second receiver-side transformation unit, which outputs a two-dimensional representation of the received communication frame comprising data signals and superimposed pilots in the delay-Doppler domain, wherein the output of the second receiver-side transformation unit is connected to a first input of the Karhunen-Loeve Basis Expansion Modeling (KL-BEM) channel estimation unit, which receives, at a second input, a signal ($x_p$) representing the superimposed pilots, and which outputs an estimation ($\hat{H}_t^i$) of the time-domain channel matrix, wherein the output of the KL-BEM estimation unit, along with the output of the second receiver-side transformation unit, is connected to respective inputs of the pilot removal unit, which is adapted to remove the superimposed pilots from the received signal (y) output from the second receiver-side transformation unit, and which outputs a signal representing an estimation of the only the data comprised in the received two-dimensional transmission frame in the delay-Doppler domain, wherein the output of the pilot removal unit is connected to the equaliser unit, which is adapted to output an estimated set of data signals ($\hat{x}_d^i$), wherein the output of the equaliser unit is fed back to a third input of the KL-BEM channel estimation unit, wherein the receiver is adapted to iteratively repeat the channel estimation in the KL-BEM channel estimation unit, which is further adapted to, in the iterations, determine further estimations $(\hat{H}_t^{i\geq1})$ of the time-domain channel matrix based on the received signal (y) output from the second receiver-side transformation unit, the signal $(x_p)$ representing the superimposed pilots, and the previously estimated set of data signals $(\hat{x}_d^i)$, to remove the superimposed pilots from the received signal (y) output from the second receiver-side transformation unit in the pilot removal unit, and to estimate a set of data signals $(\hat{x}_d^{i\geq1})$ in the equaliser unit, until a termination criterion is met.

2. The receiver according to claim 1 for an OTFS transmission system, wherein the first receiver-side transformation unit is adapted to perform a finite Fourier transform, an inverse Heisenberg- or Wigner-transform.

3. The receiver according to claim 1 for an OTFS transmission system, wherein the second receiver-side transformation unit is adapted to perform a decoding and/or a symplectic finite Fourier transform.

4. The receiver according to claim 1 for an OTFS transmission system, wherein the equaliser unit performs a message passing, a zero-forcing and/or a minimum mean square error equalisation.

5. The receiver according to claim 1 for an OTFS transmission system, further comprising a control unit that is adapted to receive information about an absolute speed and direction of the receiver over ground, an absolute speed and direction of a transmitter over ground and/or a relative speed between the receiver (300) and the transmitter, and is further adapted to pass the received information to the KL-BEM channel estimation unit.

6. The receiver according to claim 1 for an OTFS transmission system, further comprising a control unit that is adapted to receive information about the power allocation ratio used for a transmission frame, and is further adapted to pass the received information to the KL-BEM channel estimation unit and/or to the pilot removal unit.

7. A wireless device comprising a receiver for an OTFS transmission system according to claim 1.

8. A method of receiving a binary data sequence over an orthogonal time frequency space (OTFS) communication channel susceptive to doubly-selective fading, comprising:
    receiving, over the communication channel, a continuous time-domain signal representing a communication frame comprising data signals and pilots superimposed thereon,
    transforming, in a first receiver-side transformation unit, the continuous time-domain signal representing the communication frame into a two-dimensional arrangement of information symbols in the time-frequency domain that is available at an output of the first receiver-side transformation unit,
    transforming, in a second receiver-side transformation unit, the two-dimensional arrangement of information symbols comprising pilot and data signals in the time-frequency domain into a two-dimensional communication frame comprising data signals and superimposed pilots, in the delay-Doppler domain, that is available at an output of the second receiver-side transformation unit,
    i) providing the signal output from the second receiver-side transformation unit and a signal $(x_p)$ representing the superimposed pilots to a Karhunen-Loeve Basis Expansion Modeling (KL-BEM) channel estimation unit, for obtaining an estimation of the time-domain channel matrix $(\hat{H}_t^i)$ at an output of the KL-BEM channel estimation unit,
    ii) providing the estimation of the time-domain channel matrix $(\hat{H}_t^i)$ as well as the signal output from the second receiver-side transformation unit to a pilot removal unit, for removing the superimposed pilots from the received signal (y) output from the second receiver-side transformation unit,
    iii) providing the signal output from pilot removal unit to an equaliser unit, for obtaining an estimated set $(\hat{x}_d^i)$ of data signals at an output of the equaliser unit,
    iv) checking if a termination criterion is met, and
    if the termination criterion is not met,
    v) providing the previously estimated set $(\hat{x}_d^i)$ of data signals to the KL-BEM channel estimation unit and repeating steps i) to iv),
    or, if the termination criterion is met,
    outputting the previously estimated set (xd') of data signals to a demapper, for obtaining binary data transmitted in the received communication frame.

9. The method of claim 8, wherein the first transforming step comprises subjecting the continuous time-domain signal representing a communication frame to a finite Fourier transform, an inverse Heisenberg-, or Wigner-transform.

10. The method of claim 8, wherein the second transforming step comprises subjecting the two-dimensional arrangement of information symbols comprising pilot and data signals in the time-frequency domain to a symplectic finite Fourier transform.

11. The method of claim 8, wherein obtaining an estimated set of data signals in the equaliser unit comprises subjecting the signal output from pilot removal unit to a message passing, a zero-forcing and/or a minimum mean square error equalisation.

12. The method of claim 8, further comprising:
    receiving, in a control unit, information about an absolute speed and direction of the receiver over ground, an absolute speed and direction of a transmitter over ground and/or a relative speed between the receiver and the transmitter,
    determining KL-BEM parameters to be used in the channel estimation unit, and
    providing the respective determined KL-BEM parameters to the channel estimation unit.

13. A non-transitory computer readable medium storing a computer program product comprising computer program instructions which, when executed by a microprocessor, cause the computer and/or control hardware components of a receiver of an orthogonal time frequency space (OTFS) transmission system in accordance claim 1 to execute a method of receiving a binary data sequence over an OTFS communication channel susceptive to doubly-selective fading, comprising:
    receiving, over the communication channel, a continuous time-domain signal representing a communication frame comprising data signals and pilots superimposed thereon,
    transforming, in the first receiver-side transformation unit, the continuous time-domain signal representing the communication frame into a two-dimensional arrangement of information symbols in the time-frequency domain that is available at the output of the first receiver-side transformation unit,
    transforming, in the second receiver-side transformation unit, the two-dimensional arrangement of information symbols comprising pilot and data signals in the time-frequency domain into a two-dimensional communication frame comprising data signals and superimposed pilots, in the delay-Doppler domain, that is available at the output of the second receiver-side transformation unit, i) providing the signal output from the second receiver-side transformation unit and a signal representing the superimposed pilots to a Karhunen-Loeve Basis Expansion Modeling (KL-BEM) channel estimation unit, for obtaining an estimation of the time-domain channel matrix at the output of the KL-BEM channel estimation unit, ii) providing the estimation of the time-domain channel matrix as well as the signal output from the second receiver-side transformation unit to the pilot removal unit, for removing the superimposed pilots from the received signal output from the second receiver-side transformation unit, iii) providing the signal output from pilot removal unit to the equaliser unit, for obtaining an estimated set of data signals at an output of the equaliser unit, iv) checking if a termination criterion is met, and if the termination criterion is not met, v) providing the previously estimated set of data signals to the KL-BEM channel estimation unit and repeating steps i) to iv), or, if the termination criterion is met, outputting the previously estimated set of data signals to a demapper, for obtaining binary data transmitted in the received communication frame.

* * * * *